United States Patent [19]

Togashi

[11] Patent Number: 5,576,868
[45] Date of Patent: Nov. 19, 1996

[54] LIQUID CRYSTAL DISPLAY HAVING IC DRIVING CIRCUITS FORMED ON FIRST AND SECOND SUBSTRATES

[75] Inventor: Seigo Togashi, Sakado, Japan

[73] Assignee: Citizen Watch Co., Ltd., Tokyo, Japan

[21] Appl. No.: 338,540

[22] PCT Filed: Apr. 9, 1993

[86] PCT No.: PCT/JP93/00458

§ 371 Date: Dec. 8, 1994

§ 102(e) Date: Dec. 8, 1994

[87] PCT Pub. No.: WO94/24604

PCT Pub. Date: Oct. 27, 1994

[51] Int. Cl.$^6$ .................................................. G02F 1/1343
[52] U.S. Cl. ................................................ 359/88; 359/54
[58] Field of Search ............................................ 359/54, 88

[56] References Cited

U.S. PATENT DOCUMENTS

| | | | |
|---|---|---|---|
| 5,189,539 | 2/1993 | Suzuki | 359/87 |
| 5,200,847 | 4/1993 | Mawatari et al. | 359/59 |

FOREIGN PATENT DOCUMENTS

| | | |
|---|---|---|
| 0455233A3 | 11/1991 | European Pat. Off. . |
| 58-123516 | 7/1983 | Japan . |
| 63-17482 | 1/1988 | Japan . |
| 63-300224 | 12/1988 | Japan . |
| 2-210420 | 8/1990 | Japan . |
| 3-83019 | 4/1991 | Japan . |
| 4-34418 | 2/1992 | Japan . |
| 4-81723 | 3/1992 | Japan . |
| 4-86787 | 3/1992 | Japan . |

*Primary Examiner*—Wael Fahmy
*Assistant Examiner*—Fetsum Abraham
*Attorney, Agent, or Firm*—Armstrong, Westerman, Hattori, McLeland & Naughton

[57] ABSTRACT

A liquid crystal display in which driver ICs are directly mounted on substrates for accessing a display portion according to a COG mounting method, where the outward connecting portion of each driver IC is arranged in a direction substantially perpendicular to that of the display portion viewed from an IC mounting portion on which the driver IC is mounted, each outward connecting portion connecting input electrodes connected to the input terminals of each driver IC to each external wiring. The projecting lengths of flanges of the liquid crystal display on the substrates are shortened and consequently the outer dimensions of the liquid crystal display are reduced by more than 20%. Moreover, it is also possible to increase the yield of a multiple-display layout by more than 50% during manufacture. Furthermore, in case of manufacturing an active-matrix liquid crystal display employing anodic oxidation method, common-electrode-cutting-off portions and consequently the cutting-off process thereof can be omitted to simplify the manufacturing process.

4 Claims, 4 Drawing Sheets

LIQUID CRYSTAL DISPLAY HAVING IC DRIVING CIRCUITS FORMED ON FIRST AND SECOND SUBSTRATES

FIELD OF THE INVENTION

The present invention relates to a liquid crystal display, particularly to that comprising semiconductor integrated circuits (hereinafter referred to as "driver ICs") directly mounted on substrates for driving a display portion.

DESCRIPTION OF THE RELATED ART

A liquid crystal display is widely used in a liquid crystal TV, a video camera, a personal computer, a word processor, an electronic desk calculator, and other various information processing devices.

Particularly, a so-called COG (chip-on-glass) mounting method, i.e., a method of directly mounting the driver ICs for driving the display portion on substrates such as glass substrates is in increasing commercial use since the mounting portion is very compact in size and low in mounting cost in this method.

FIG. 3 is a plan view of a conventional liquid crystal display which employs the COG mounting method. As illustrated in the figure, the liquid crystal display is equipped with first and second substrates 1 and 2, on which driving electrodes 3 and 4 are formed, respectively.

A display portion 5 in which liquid crystal is encapsulated is accessed by way of the driving electrodes 3 and 4.

Driver ICs 6 and 7 are mounted on the first and second substrates 1 and 2 and, more particularly, are directly mounted (COG mounting) on the first and second substrates 1 and 2 in areas of IC mounting portions 8 and 9, respectively. The driving electrodes 3 and 4 are connected to output terminals 42 and output terminals 43 of the driver ICs 6 and 7, respectively.

Moreover, input electrodes 30 and input electrodes 31 are formed on the first and second substrates 1 and 2, respectively, and the input electrodes 30 and 31 are connected to the input terminals 40 and input terminals 41 of the driver ICs 6 and 7, respectively.

The input electrodes 30 and input 31 set forth above are connected to external wirings 34 and 35 in areas of outward connecting portions 32 and 33 respectively for supplying signals or voltages to the liquid crystal display from outside.

One aspect of such a conventional liquid crystal display is that the outward connecting portions 32 and 33 are disposed in areas in directions reverse to those of the display portion 5 viewed from the mounting portions 8 and 9 indicated by arrows 16 and 17, respectively, i.e., in areas in directions indicated by arrows 38 and 39 as illustrated in FIG. 3.

A liquid crystal display of high quality employs an active matrix system in which each pixel constituting the display portion is directly controlled by a switching element.

As representative switching elements, there are a TFT (Thin Film Transistor) which is a three-terminal switching element and an MIM (Metal-Insulator-Metal) which is a two-terminal switching element.

The TFT is an MIS (Metal-Insulator-Semiconductor) type field effect transistor, in which a gate insulating film serving as an insulator is particularly important. Recently an anodic oxidation film formed by subjecting tantalum (Ta) or Aluminum (Al) to anodic oxidation treatment has become mainstream as a gate insulating film which is pin-hole free and excellent in controllability.

The MIM which makes use of the nonlinear electrical conductivity of a (semi-) insulating thin film having a thickness of about 50 nm requires the controllability and uniformity of the (semi-) insulating thin film more than the TFT. The most of the (semi-) insulating thin films used in the MIM are also the anodic oxidation film formed by subjecting tantalum (Ta) to anodic oxidation treatment.

As described above, the fabrication of the active-matrix liquid crystal display of the TFT or MIM requires the anodic oxidation treatment, which further requires a common electrode for applying voltage.

In general, the fabrication of such a liquid crystal display employs a method comprising steps of forming a plurality of liquid crystal displays on a comparatively large substrate and dividing the same into individual liquid crystal displays after the same are almost completed, i.e., a so-called multiple-display layout method.

In case of fabricating the liquid crystal display by way of the multiple-display layout according to the aforementioned COG mounting method, however, forming the common electrode for the anodic oxidation treatment is no easy work. It will be described with reference to FIG. 4 hereinafter.

FIG. 4 is a plan view showing a pattern configuration of multiple-display layout for fabricating the MIM type active-matrix liquid crystal display according to the COG mounting method.

The liquid crystal display illustrated in FIG. 3 has dimensions of 25.7 mm×22 mm. However, the provision of the common anodic oxidation electrode for driving electrodes to apply voltage thereto so as to perform the anodic oxidation treatment makes it impossible to arrange the liquid crystal displays close to each other.

In the conventional liquid crystal display described above, the outward connecting portion 33 formed on a substrate 50 is disposed at the opposite side of the display portion 5 relative to the mounting portion 9 as illustrated in FIG. 4.

Accordingly, it is necessary to separate a driving-electrode-anodicoxidation common-electrode 52 for anodic oxidation of the driving electrodes 3 for driving the liquid crystal panels of the display portions 5 of several liquid crystal displays vertically arranged in a second column (a right column in FIG. 4) from the outward connecting portions 33 of liquid crystal displays in a first column (a left column in FIG. 4). For this purpose, a common-electrode-cutting-off portion 53 which is an independent area intervening between the first and second columns is required.

The common-electrode-cutting-off portion 53 which is necessary during the process of fabrication has to be removed by cutting the substrate 50 along scribed lines 51 and 51.

Whereupon, the need for minaturization of the liquid crystal display is rapidly increasing every day.

For example, a liquid crystal display used in the color-view finder of a camcorder (a video camera with an incorporated VCR) requires a display portion having a diagonal dimension of 18 mm (0.7 in.) or less. Such a use requires not only a small dimension of display screen but also a small outer dimension of the liquid crystal display.

FIG. 3 shows a conventional liquid crystal display, indicating therein the dimensions of each part in case of a viewfinder having a diagonal dimension of 0.7 in.

The figure shows that the respective projecting lengths A and B of a right and an upper flanges wherein the first and second substrates 1 and 2 do not overlap each other need to be both about 7 mm for providing the mounting portions 8 and 9 and the outward connecting portions 32 and 33 on the right and upper flanges, respectively. That is, the figure teaches that the flange projecting lengths A and B are the primary limiting factor in the minaturization of the liquid crystal display.

The present invention has been made in view of such a conventional technical background and a first desired result is to reduce the outer dimension of the liquid crystal display without changing that of the display portion thereof.

A second goal is to increase the number of liquid crystal displays in the aforementioned multiple-display layout in a substrate so as to reduce the cost. Reducing the outer dimension of the liquid crystal display is important for solving this problem.

In case of the multiple-display layout, about 120 viewfinder liquid crystal displays each having a size illustrated in FIG. 3 can be formed in a substrate of 300 mm square.

Consequently, only reducing the outer dimension of a viewfinder liquid crystal display by 2.5 mm in length and width causes the production of 168 viewfinder liquid crystal displays on the same substrate, increasing the yield as much as 40%.

Moreover, in order to increase the number of the view liquid crystal displays in a multiple-display layout, it is necessary to eliminate the common-electrode-cutting-off portion 53 for anodic oxidation, the common-electrode-cutting-off portion 53 having been indispensable in the prior art as illustrated in FIG. 4.

The common-electrode-cutting-off portion 53 having a width for scribing and breaking requires at least 5 mm for fabricating process according to the prior art, which limits the number of liquid crystal displays formed on the substrate.

A third goal of the present invention is to simplify the fabricating process by omitting the step of cutting off the common-electrode cutting-off portion 53 for anodic oxidation illustrated in FIG. 4 in case of the active-matrix liquid crystal display in which the switching elements include the anodic oxidation film.

Accordingly, the present invention aims to reduce the outer dimension of the liquid crystal display in which driver ICs are directly mounted on substrates according to the COG mounting method and increase the number of the liquid crystal displays in a multiple-display layout on the same substrate at the time of fabrication to reduce. Moreover, it also aims to simplify the fabricating process by omitting the step of cutting off the common electrode for anodic oxidation in case of the active-matrix liquid crystal display which employs the anodic oxidation method.

SUMMARY OF THE INVENTION

In order to attain the above object, the arrangement of a display portion, IC mounting portions and outward connecting portions is optimized in the liquid crystal display of the present invention. That is, the direction of the display portion viewed from each IC mounting portion on which a driver IC is mounted is arranged substantially perpendicular to that of the outward connecting portion of the IC mounting portion viewed from the IC mounting portion.

Besides, in case of a liquid crystal display having an active-matrix system display portion which requires anodic oxidation process, a common electrode for anodic oxidation of driving electrodes is disposed in an area at the opposite side of the display portion relative to the IC mounting portion.

By doing so, it is possible to shorten the projecting lengths of flanges on the substrate of a liquid crystal display for reducing the outer dimension of the entire liquid crystal display, increasing the yield of a multiple-display layout and omitting the removing process of the common-electrode-cutting-off portion, and also reducing area necessary for cutting off the same.

DETAILED DESCRIPTION OF THE PREFERRED EMBODIMENT

A preferred exemplary embodiment of the present invention will be described with reference to drawings attached to the specification to explain it more in detail.

Figure 1:
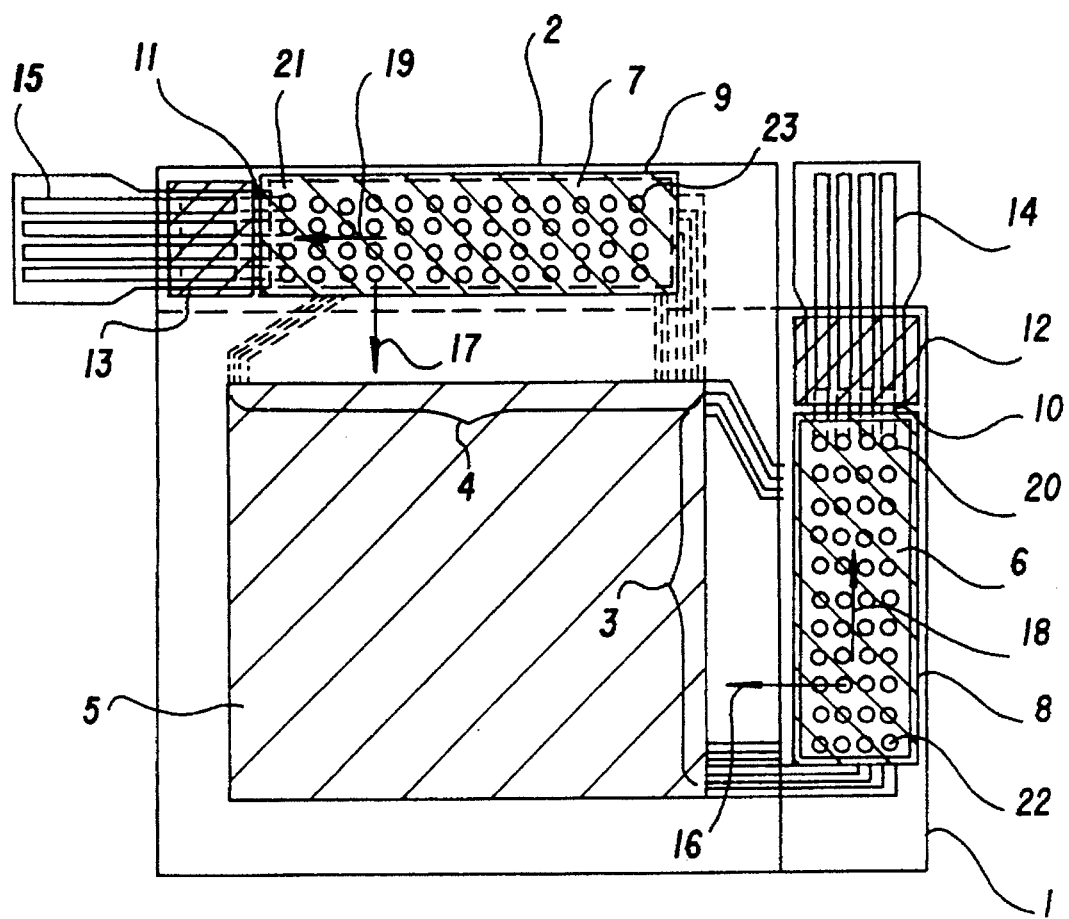
FIG. 1 is a plan view of a liquid crystal display according to an embodiment of the present invention and FIG. 2 is a plan view showing a multiple-display layout at the time of fabricating the liquid crystal display.

FIG. 1 is a plan view of a liquid crystal display according to the preferred exemplary embodiment of the present invention.

Figure 3:
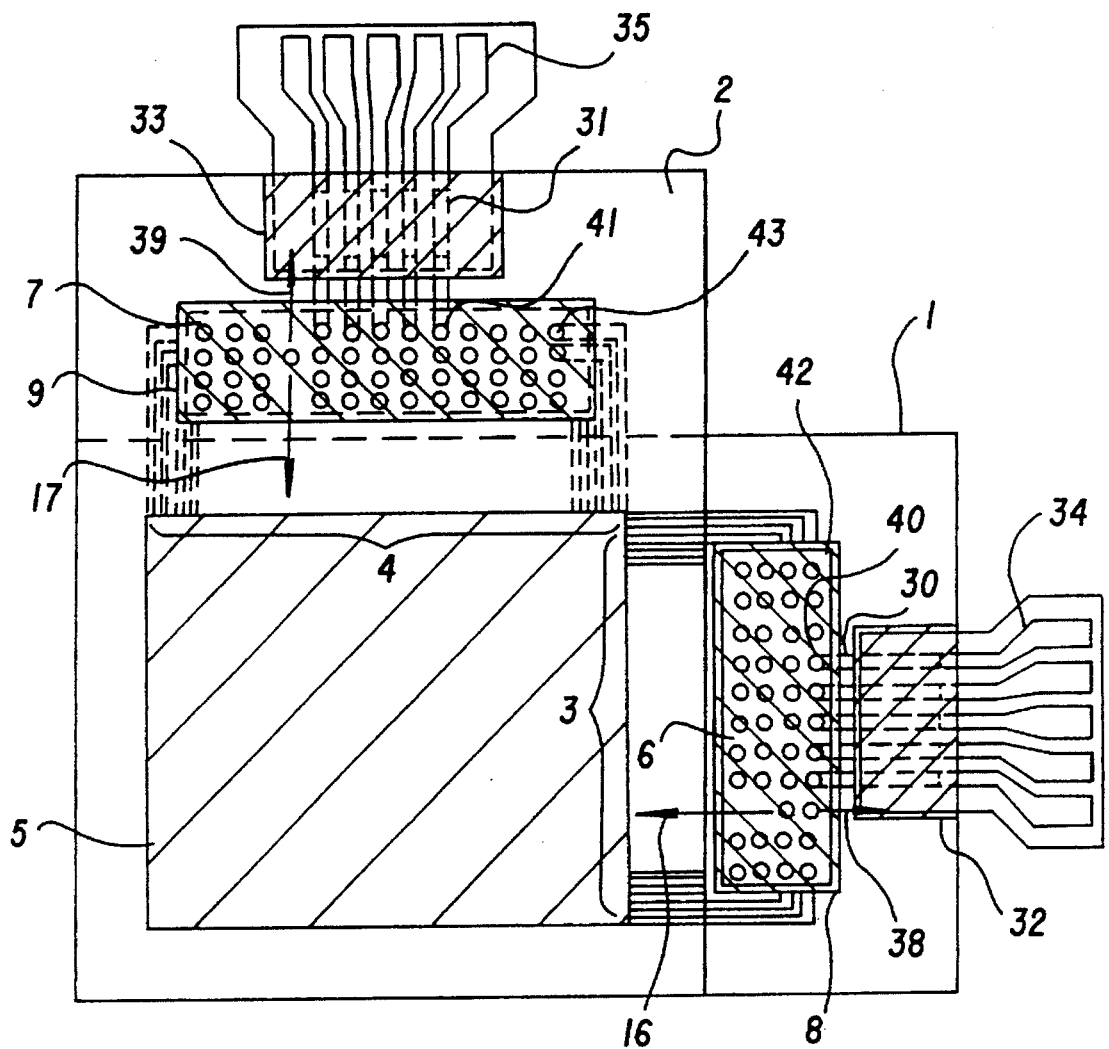
FIG. 3 is a plan view showing an example of a conventional liquid crystal display and FIG. 4 is a plan view showing a multiple-display layout at the time of fabricating the conventional liquid crystal display.

The liquid crystal display comprises driving electrodes 3 and driving electrodes 4 on first and second substrates 1 and 2, respectively, and a display portion 5 is accessed by driver ICs 6 and 7 by way of the driving electrodes 3 and 4 respectively in the same manner as in the prior art illustrated in FIG. 3. The driver ICs 6 and 7 are directly mounted in areas of mounting portions 8 and 9 on first and second substrates 1 and 2, respectively according to the COG mounting method.

The COG mounting method comprises, for example, steps of applying conductive adhesive to projecting electrodes formed on the driver ICs 6 and 7 and connecting the projecting electrodes formed on the driver IC 6 and those formed on the driver IC 7 to the first and second substrates 1 and 2, respectively.

The driving electrodes 3 and 4 are connected to the output terminals 22 and output terminals 23 of the driver ICs 6 and 7, respectively.

Input electrodes 10 and input electrodes 11 are also formed on the first and second substrates 1 and 2, respectively. The input electrodes 10 and 11 are connected to the input terminals 20 and 21 of the driver ICs 6 and 7 respectively.

The input electrodes 10 and 11 of the driver ICs 6 and 7 are connected to external wirings 14 and 15 in areas of outward connecting portions 12 and 13, respectively.

The feature of the liquid crystal display according to the present invention is that the outward connecting portions 12 and 13 are arranged in areas in the directions (those indicated by arrows 18 and 19) perpendicular to those of display portion 5 viewed from the mounting portions 8 and 9 respectively.

In order to provide the outward connecting portions 12 and 13 in the areas in the directions substantially perpendicular to those of the display portion 5 viewed from the mounting portions 8 and 9, respectively, as described above, a semiconductor integrated circuit having the input terminal 20 on the shorter side thereof and a semiconductor integrated circuit having the input terminal 21 on the shorter side thereof are employed for the driver ICs 6 and 7, respectively.

Figure 2:
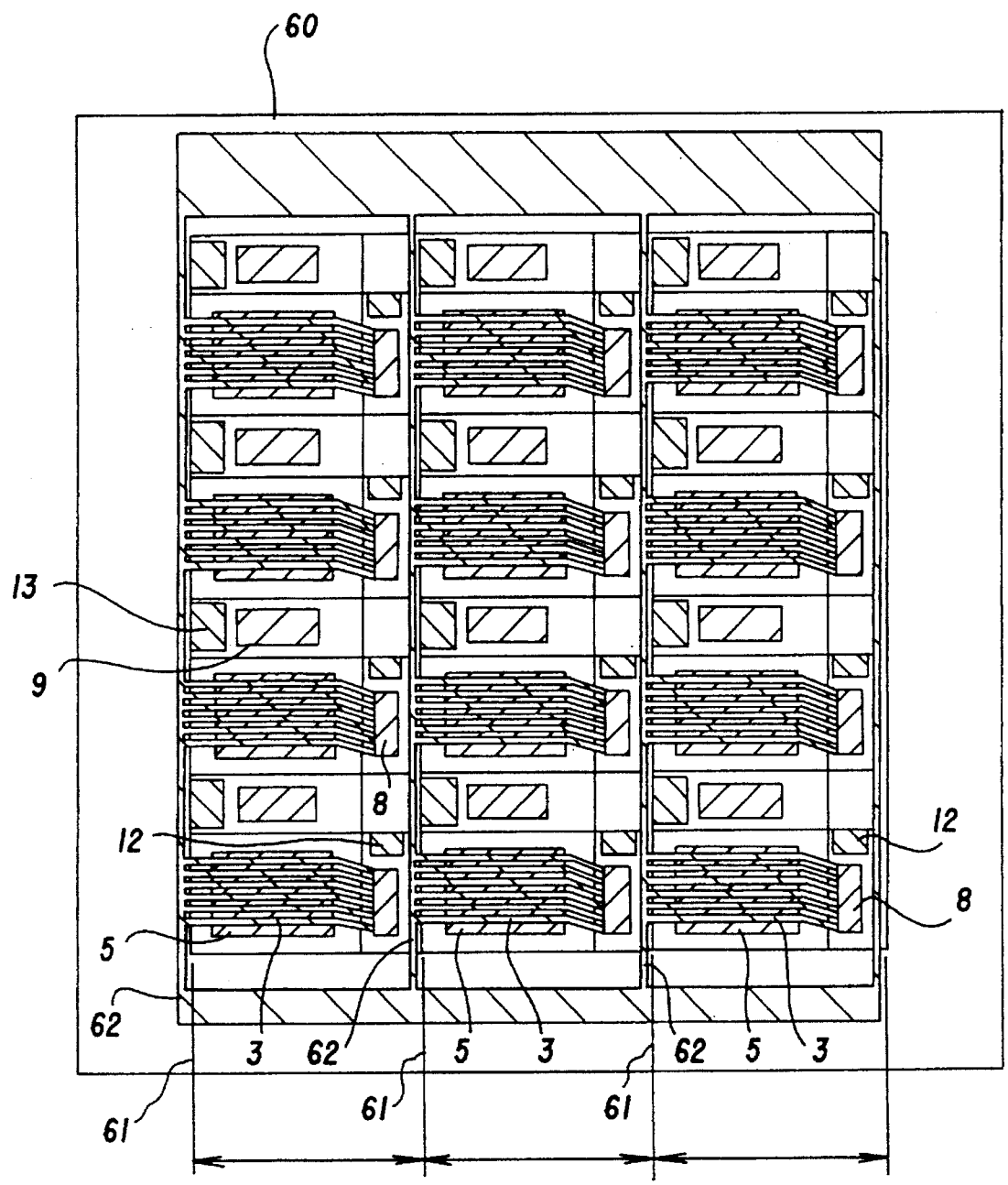

FIG. 2 is a plan view showing an example of a multiple-display layout of liquid crystal displays on a large substrate.

Figure 4:
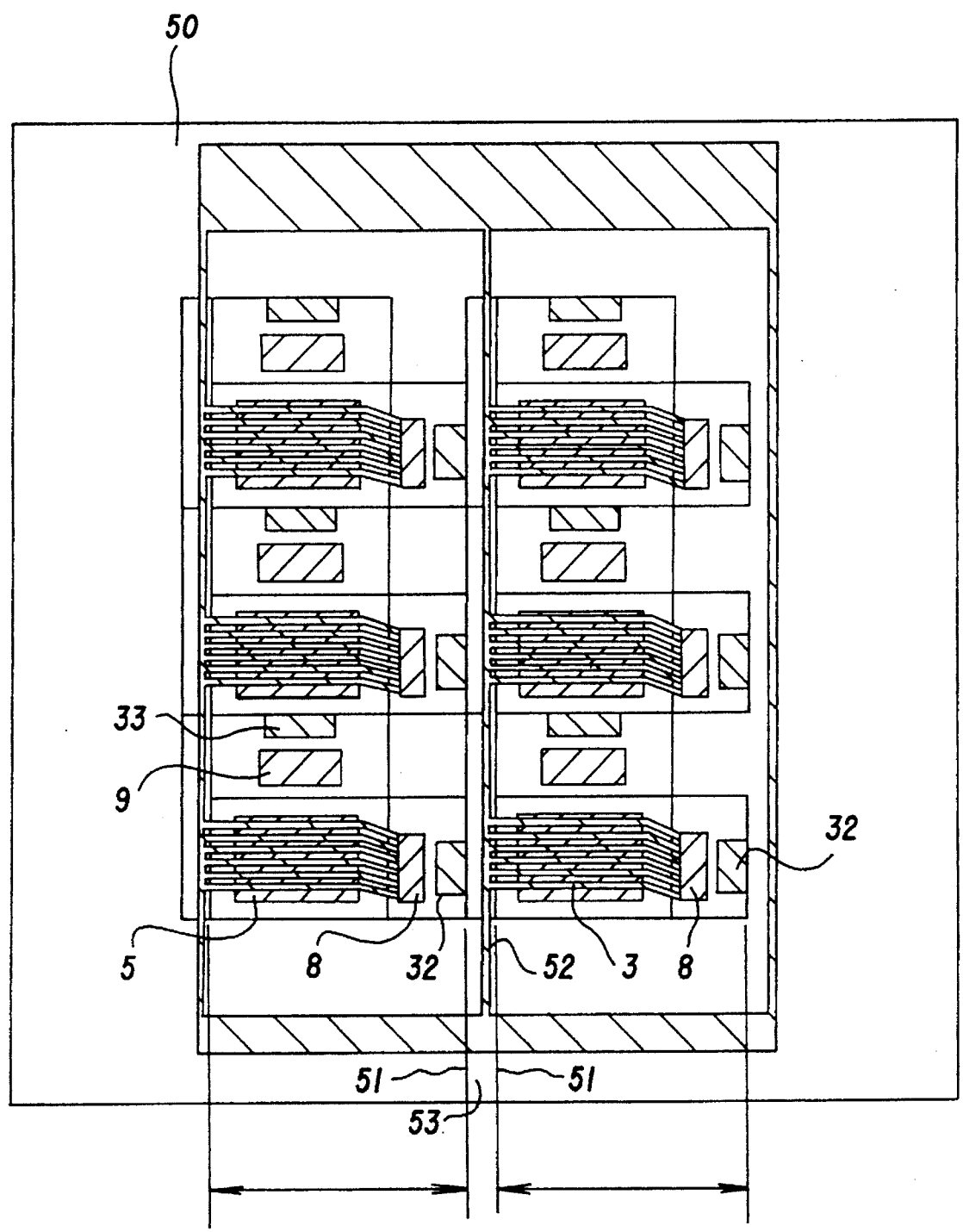

The arrangement of the multiple-display layout is different from the prior art illustrated in FIG. 4 in the arrangement of the outward connecting portions 12 and 13, which are provided on a substrate 60 in directions substantially perpendicular to those of the display portion 5 viewed from the mounting portions 8 and 9, respectively.

As a result, the outward connecting portions 12 and 13 do not contact with a driving-electrode-anodic-oxidation common-electrode 62 for anodic oxidation of the driving electrode 3.

The configuration of this embodiment does not need the special area for the common-electrode-cutting-off portion 53 as in the prior art illustrated in FIG. 4, and the substrate 60 can be cut along a scribed line 61.

For example, the driving-electrode-anodic-oxidation common-electrode 62 for liquid crystal panels of a second column II which is a central column illustrated in FIG. 2 can be disposed on liquid crystal panels of a first column I adjacent to the second column II on the left side thereof without obstructing the outward connecting portions 12 of the liquid crystal displays. Likewise, the driving-electrode-anodic-oxidation common-electrode 62 for liquid crystal panels of a third column III can be also disposed on liquid crystal panels of the second column II without obstructing the outward connecting portions 12 of the liquid crystal displays.

Accordingly, the liquid crystal display according to the embodiment has the following effects.

A first effect is that the liquid crystal display can have reduced outer dimensions. A conventional viewfinder liquid crystal display having a diagonal dimension of 0.7 in. illustrated in FIG. 3 has required an outer dimension of 25.7 mm×22 mm≈565 mm$^2$. On the other hand, in the embodiment of the present invention illustrated in FIG. 1, it requires an outer dimension of (18.7 mm+4 mm)×(15 mm+4 mm)≈431 mm$^2$, which is reduced by about 24% compared with the former.

It is because the projecting lengths a and b of flanges of the first and second substrates 1 and 2 in the liquid crystal display illustrated in FIG. 1 are shorter than the lengths A and B of flanges in the conventional liquid crystal display illustrated in FIG. 3 by 3 mm respectively. As a result, it is possible to miniaturize a video camera by employing the liquid crystal display of the invention as a viewfinder.

A second effect is that it is possible to reduce the cost in fabricating the liquid crystal display by increasing the yield of a multiple-display layout. The reduction in outer dimension largely contributes to the second effect as well as to the first effect.

Furthermore, omitting the area of the common-electrode-cutting-off portion which has been indispensable in prior art for anodic oxidation of the driving electrodes also has a great effect.

That is, as evident from comparison between a multiple-display layout of a prior art shown in FIG. 4 and that of the embodiment of the present invention shown in FIG. 2, firstly the outer dimension is reduced by 3 mm both in the x-direction (a lateral direction in the figure) and in the y-direction (a vertical direction in the figure). Moreover, the area for the common-electrode-cutting-off portion 53 which has required at least 5 mm for scribing and breaking in the prior art illustrated in FIG. 4 is omitted in FIG. 2, so that the dimension of the liquid crystal display is reduced in the x-direction by the omitted area.

As a result, a liquid crystal display requires about 431 mm$^2$ (22.7 mm×19 mm) according to the present invention, while it has required about 675 mm$^2$ (30.7 mm×22 mm) in prior art, effecting 36% decrease in installation area and more than 50% increase in the yield from a substrate of the same size.

A third effect is that of omitting the process of removing the common-electrode-cutting-off portion for anodic oxidation can simplify fabricating process.

Prior art has required many scribed lines and breaking the substrate within a narrow strip of area, causing a problem in fabricating process, but in case of fabricating the liquid crystal display according to the present invention it is possible to automatically separate the driving-electrode-anodic-oxidation common-electrode too in a normal individual cutting process.

FIGS. 1 and 2 provide specific values for the outer dimensions of the liquid crystal display, length of the flanges etc. and the above description employs these values which represent only a preferred exemplary embodiment of the invention, but the present invention is not limited to these values. The aforementioned first to third effects can be obtained in this invention regardless of these dimensions.

As described above, since the liquid crystal display of the invention can be reduced in outer dimension relative to the size of its display portion, it is most suitable for a viewfinder etc. of a video camera and can miniaturize an apparatus equipped with the liquid crystal display such as the video camera etc. Moreover, the liquid crystal display can be reduced in production cost, so that it can be provided at a lower cost than before and can be expected to be widely used as a display for various devices.

I claim:

1. A liquid crystal display having first and second substrates comprising:

a display portion;

driving electrodes which are connected to the output terminals of first and second driver ICs for accessing said display portion;

IC mounting portions formed on said first and second substrates for mounting said first and second driver ICs, respectively, thereon; and first and second outward connecting portions for connecting input electrodes which are connected to input terminals of said first and second driver ICs, respectively, to external wirings;

wherein a direction of said outward connecting portion of said each IC mounting portion viewed from said IC mounting portion is arranged substantially perpendicular to that of said display portion viewed from said IC mounting portion, and wherein said first and said second outward connecting portions extend separately from different locations on the first and second substrates, respectively.

2. A liquid crystal display according to claim 1, characterized in that said display portion is of active-matrix system in which switching elements control pixels, and said switching elements include anodic oxidation film and a driving-electrode-anodic-oxidation common-electrode is provided in an area at the opposite side of said display portion relative to said IC mounting portion.

3. A liquid crystal display according to claim 2, characterized in that said switching elements are MIMs.

4. A liquid crystal display according to claim 2, characterized in that said switching elements are TFTs.

* * * * *